United States Patent [19]

Hartman et al.

[11] Patent Number: 4,944,953
[45] Date of Patent: Jul. 31, 1990

[54] PURIFICATION OF HYDROLYSED PROTEIN WITH CRYSTALLINE ZEOLITE

[75] Inventors: Guy J. Hartman; Gary G. Spyres, both of Decatur, Ill.

[73] Assignee: A. E. Staley Manufacturing Company, Decatur, Ill.

[21] Appl. No.: 354,543

[22] Filed: May 19, 1989

[51] Int. Cl.$^5$ ................................................ A23J 3/30
[52] U.S. Cl. .................................... 426/271; 426/422; 426/423; 426/495; 426/656; 210/670
[58] Field of Search ............... 426/271, 422, 423, 425, 426/656, 495; 210/670

[56] References Cited

U.S. PATENT DOCUMENTS

| | | | |
|---|---|---|---|
| 4,075,195 | 2/1978 | Roland | 260/119 |
| 4,165,391 | 8/1979 | Corbett | 426/580 |
| 4,259,944 | 7/1988 | Fäsi et al. | 426/650 |
| 4,471,114 | 9/1984 | Sherman et al. | 536/127 |
| 4,571,306 | 2/1986 | Kozak | 252/351 |
| 4,648,977 | 3/1987 | Garg et al. | 210/673 |
| 4,759,944 | 7/1988 | Fasi et al. | 426/650 |
| 4,873,108 | 10/1989 | De Rooij et al. | 426/533 |

OTHER PUBLICATIONS

*European Patents Abstracts,* Week 8931, Food, Disinfectants and Detergents, p. 19.
J. Velisek et al., "Chlorohydrins in Protein Hydrolysates", *Z. Lebensm. Unters. Froch,* vol. 167, pp. 24–44 (1978).
Breck, *Zeolite Molecular Sieves,* pp. 715–718 (John Wiley & Sons, N.Y., N.Y., 1974).
Broughton, "Adsorptive Separation (Liquids)", *Encyclopedia of Chemical Technology,* pp. 563–581 (John Wiley & Sons, N.Y., N.Y., Kirk–Othmer eds, 3rd ed., 1978).
*Japanese Patents Gazette,* Week 8521, Food; Disinfectants; Detergents, p. 5, (Derwent Publications Ltd., London, England, 1985).
Anon., "Union Carbide Molecular Sieves", pp. 1–20, Union Carbide Technical Bulletin F–1979F, 9–83.
A. K. Smith et al., *Soybeans: Chemistry and Technology,* pp. 398–401 (AVI Publ. Conn., Westport, CT, 1972).

*Primary Examiner*—Donald E. Czaja
*Assistant Examiner*—Evan Federman
*Attorney, Agent, or Firm*—Michael F. Campbell; J. Daniel Wood

[57] ABSTRACT

A method of purifying hydrolysed protein compositions by contact with crystalline zeolite agglomerates is provided. A reduction in the concentration of chlorohydrins, measured as 1,3-dichloropropen-2-ol, in hydrolysed protein compositions can be obtained by contacting the hydrolysed protein composition with a crystallin zeolite agglomerate, e.g., as pellets, beads or granules of crystalline zeolite. The method allows removal of chlorohydrins without affecting the organoleptic qualities of the hydrolysed protein.

10 Claims, No Drawings

PURIFICATION OF HYDROLYSED PROTEIN WITH CRYSTALLINE ZEOLITE

FIELD OF INVENTION

This invention relates to a method of purifying hydrolysed protein compositions useful as food ingredients.

BACKGROUND OF THE INVENTION

The hydrolysis of proteins to produce food ingredients is well known. For example, U.S. Pat. No. 4,165,391 (Corbett) discusses the use of hydrolysed vegetable proteins (HVP) as flavoring agents for providing meaty flavor and/or flavor intensity to foods. Corbett notes that acid hydrolysis of vegetable proteins is the most important method (as compared with enzymic hydrolysis and alkaline hydrolysis) from the standpoint of food products and that hydrochloric or sulfuric acid is generally used in the hydrolysis.

The use of hydrochloric acid in the hydrolysis of proteins has been implicated in the production of chlorohydrins from residual glycerol in the protein source. J. Velisek et al., "Chlorohydrins in Protein Hydrolysates", *Z. Lebensm. Unters. Forsch*, Vol. 167, pp. 24–44 (1978). Methods of removing chlorohydrins or preventing their formation are discussed in U.S. Pat. No. 4,759,944 (Fasi et al.). Fasi et al. state that preventing the formation of chlorohydrins is impractical without altering the organoleptic qualities (e.g., taste) of the hydrolysed protein. Likewise, decolorizing with carbon or rectification (i.e., fractional distillation) to remove chlorohydrins are characterized as impractical. Fasi et al. disclose a method for removing chlorohydrins from hydrolysed protein which involves subjecting the hydrolysed protein to steam distillation under reduced pressure while keeping the density of the hydrolysed protein substantially constant.

While the steam distillation method of Fasi et al. may well reduce the concentration of chlorohydrins in a hydrolysed protein, it is difficult to understand how such a method, involving steam distillation under reduced pressure, will not also remove volatile aroma and flavor components from the hydrolysed protein and thereby alter its organoleptic qualities.

SUMMARY OF INVENTION

This invention relates to a method of purifying a hydrolysed protein comprising contacting an aqueous mixture of hydrolysed protein and chlorohydrin (e.g., having a chlorohydrin concentration greater than about 50 ppb) with a crystalline zeolite agglomerate (e.g., at a contact time of from about 10 seconds to about 1,000 seconds and a contact level of about 0.01% to about 10%) to reduce the amount of chlorohydrin in said aqueous mixture (e.g., to no greater than about 50 ppb).

This invention also relates to a method of preparing hydrolysed proteins useful as food ingredients comprising hydrolysing a protein in an aqueous medium at an acidic pH, said aqueous medium additionally comprising chloride and a member selected from the group consisting of glycerol and precursors thereof and contacting said aqueous medium, after said hydrolysing, with a crystalline zeolite agglomerate.

It has been found that crystalline zeolite agglomerate can be used to remove chlorohydrins from hydrolysed protein without significantly altering the organoleptic qualities of the hydrolysed protein.

DETAILED DESCRIPTION OF THE INVENTION

The hydrolysed protein compositions which can be advantageously treated in accordance with this invention will generally contain small, but measurable, amounts of chlorohydrins, e.g., 1,3-dichloropropan-2-ol (DCP). As used herein, the term chlorohydrins shall be used to denote the chlorinated products of the reaction glycerol with chloride in the presence of acid. Thus, the term "chlorohydrins" includes not only DCP, but 3-chloro-propan-1,2-diol, and 2,3-dichloro-propan-1-ol as well. However, as used herein, the term "chlorohydrin concentration" shall refer to, unless noted otherwise in context, the concentration of DCP measured as described below.

The hydrolysed protein compositions are prepared by the acid hydrolysis of a proteinaceous material. Commonly available proteinaceous materials generally contain glycerol and/or a precursor thereof, e.g., a fatty triglyceride. To obtain superior organoleptic qualities, hydrochloric acid is generally employed in the acid hydrolysis of the proteinaceous material. Accordingly, glycerol and chloride are available in the presence of acid and thus react to form chlorohydrins during hydrolysis of the protein.

The precise concentration of chlorohydrins in the hydrolysed protein will vary according to the nature of the proteinaceous material (e.g., the concentration of glycerol and precursors thereof) and hydrolysis conditions chosen (e.g., the concentrations of chloride and water in the hydrolysis medium). Typical chlorohydrin concentrations, measured by gas chromatography as DCP, will typically range from about 100 to about 1,000 parts per billion of the hydrolysed protein composition.

The source of the proteinaceous material from which the hydrolysed protein is derived may vary widely. Proteins from animal sources (e.g., beef extract from beef and fish protein meal from fish) or microbial sources (e.g., dried distillers solubles from yeast) may be hydrolysed. Typically, however, the hydrolysed protein will be hydrolysed vegetable protein (HVP) obtained by the hydrolysis of a vegetable protein material. Such materials should generally contain greater than 25% by weight protein (as measured by Kjeldahl nitrogen analysis). Examples of sources of vegetable protein materials include wheat gluten, corn gluten, extracted soy flour, soy protein concentrates, peanut flour, peanut protein concentrate, extracted cottonseed meal, cottonseed protein concentrate, and extracted canola (i.e., low erucic acid rapeseed) meal. The proteins may be used singly or in various combinations.

The hydrolysis of the proteinaceous material is accomplished by treating the material with aqueous acid, for example by conventional acid hydrolysis using 2N to 12N hydrochloric acid, or its equivalent. The preferred normality of the acid for hydrolysis is 4N to 6N. Typically, 6N hydrochloric acid is heated to 60°–90° C., preferably 110°–120° C., in a steam jacketed, glass-lined or enameled reaction kettle equipped with an agitator. Protein material (e.g., in an amount, by weight, about 50% greater than the hydrochloric acid) is next added to the hot hydrochloric acid and heating is continued under reflux with continuous stirring for 2 to 10 hours, preferably about 5 to 6 hours. The degree of hydrolysis may vary, but will typically result in a product in which at least 80% of the amine nitrogen is present as free amine. The resulting hydrolysed protein may be filtered to remove insolubles, primarily humin, and the filtered material discarded. This first filtration can be accomplished before or after substantial neutralization of the hydrolysed protein with concentrated alkali, typically sodium carbonate. The hydrolysed protein may then be allowed to age, e.g., for a few days to a few weeks, in order to allow separation of slowly crystallizing substances and slowly agglomerating colloidal particles by filtration or other physical means.

The hydrolysed protein may optionally be decolorized with activated carbon by conventional methods, either before or after contacting with crystalline zeolite agglomerate. Such treatment may remove insolubles which can foul the crystalline zeolite agglomerate, and thus decolorization before contacting the zeolite is preferred.

The purification accomplished by this invention involves contacting the hydrolysed protein with a crystalline zeolite agglomerate. The typical nature of the zeolites and the typical means of contacting will be discussed more fully below. However, the term "contacting", without more, is meant herein to include any means of associating the hydrolysed protein with the granular zeolite that is effective in allowing adsorption by the granular zeolite of chlorohydrins in the hydrolysed protein. The term "agglomerate" is meant to include a crystalline zeolite having a particle size greater than the individual crystals of the zeolite, which is typically less than about 100 micrometers. In other words, "agglomerate" generally refers to zeolites in which two or more zeolitic crystallites are in a fixed physical relationship to one another. Crystalline zeolite agglomerates are typically available as pellets having sizes on the order of 1/6" and ⅛" as beads of 4×8, 8×12, and 14×30 mesh, and as granules of 20×60 mesh.

Crystalline zeolites have the basic chemical formula of $M_{2/n}O \cdot Al_2O_3 \cdot xSiO_2 \cdot yH_2O$ where M is a cation of valence n. Although similar in chemical composition, crystalline zeolites are to be distinguished from gel-type amorphous alumino-silicates commonly referred to as zeolites and which are used as water softeners.

The fundamental building-block of the zeolitic crystal structure is a tetrahedron of four oxygen anions surrounding a smaller silicon or aluminum cation. The sodium ions or other cations serve to make up the positive charge deficit in the alumina tetrahedra. Each of the four oxygen anions is shared, in turn, with another silica or alumina tetrahedron to extend the crystal lattice in three dimensions.

The resulting crystal is unusual in that it is honeycombed with relatively large cavities—each cavity connected with six adjacent ones through apertures or pores. The water of hydration is contained within these cavities. Type A, for example, contains roughly spherical cavities, approximately 11 angstroms in diameter and about 925 cubic angstroms in volume, that account for almost half of the total crystalline volume. This volume is available for adsorption. The free aperture size in the sodium-bearing Type 4A is 3.5 angstroms in diameter. At usual operating temperatures, this allows the passage of molecules with an effective diameter as large as 4 angstroms.

In general, the elasticity and kinetic energy of incoming molecules allows easy passage of molecules up to 0.5 angstroms larger than the free diameter of the aperture. The size and position of the exchangeable cations may affect the free aperture size in any particular type of crystalline zeolite. Thus, the replacement of sodium ions in Type 4A with calcium ions produces Type 5A, with a free aperture size of 4.2 angstroms. The cations are also probably responsible for the very strong and selective adsorptive forces which are unique with these adsorbents.

The zeolite preferred for use herein is zeolite Type A. The commercial production of zeolites has been accomplished by a variety of methods, including the hydrogel process and the clay conversion process. The production of zeolite Type A by the former process is described in U.S. Pat. Nos. 2,882,243 (Milton), 2,841,471(Sensel), 2,847,280 (Estes), 3,058,805 (Weber), 3,433,588 (Michel et al.), 3,094,383 (Dzierzanowski et al.), 3,348,911 (Michalko I), 3,556,451 (Michalko II), 3,359,068 (Michalko III), and 3,386,802 (Michalko IV). Production of Type A by the latter process of clay conversion is described in U.S. Pat. Nos. 3,009,776 (Sensel), 3,114,603 (Howell), 3,185,544 (Maher), 3,205,037 (Maher et al.), and 3,535,075 (Veda et al.).

In a typical commercial manufacture of crystalline zeolite Type A, sodium silicate, alumina trihydrate and sodium hydroxide are automatically batch-weighed into mix tanks and stirred until homogeneous. The resulting gel is pumped into a crystallization tank where it is maintained under closely controlled conditions. The progress of crystallization is monitored by several quality control techniques, including x-ray diffraction.

After crystallization is complete, the crystal slurry is filtered and washed. If calcium or other cations are to be substituted for sodium in the crystal, the filter cake is transferred to a heated tank where it is mixed with a solution of the appropriate metal salt. As with the treatment of the original crystal slurry, the exchanged forms are washed and filtered.

To form commercial 1/16- and ⅛-inch (about 1/6- and ⅛-cm) pellets, crystals from the filter (mostly in the 0.1 to 10 micrometer range) are mixed with clay binders (typically at a binder concentration of about 20% by weight) and fed through an extruder. The pellets are then dried, screened and fired in a rotary kiln.

As noted above, the hydrolysed protein can be contacted with the granular crystalline zeolite by a variety of means, so long as the means chosen yield the desired degree of purification of the hydrolysed protein. The hydrolysed protein will typically exist as an aqueous solution. Accordingly, the zeolite can be used as a static purifying agent in which the zeolite is added to the aqueous solution of hydrolysed protein. Sufficient time is then allowed to remove the desired amount of chlorohydrins before recovery of the zeolite, e.g., by filtration, centrifugation or decantation. The recovered zeolite may then be regenerated prior to reuse. However, recurrent handling of the zeolite such as addition to and recovery from solutions of hydrolysed protein may cause attrition of the agglomerate form, thereby reducing or eliminating its utility. Accordingly, dynamic purification techniques in which the zeolite is held in a fixed bed and the aqueous solution of hydrolysed protein is introduced into and removed from the fixed bed are preferred.

In purifying the hydrolysed protein by dynamic purification techniques, a bed of solid zeolite adsorbent is loaded with an aqueous solution of hydrolysed protein, e.g., by gravity feed or forced pumping. The purified hydrolysed protein is then removed from the adsorbent bed. Desorbent can then be added to the bed to desorb the adsorbed chlorohydrins and regenerate the zeolite. The desorbent, now in admixture with the desorbed chlorohydrins, is then removed from the bed.

The zeolite adsorbent can be contained in a single bed (e.g., for a batch process), a plurality of beds in which a swing-bed operation is employed (e.g., a two-bed, two-cycle system of adsorbing with one bed while regenerating the other bed), or a simulated moving bed (e.g., one or more beds having apparatus allowing movement of points of introduction of hydrolysed protein feed and desorbent feed and product extract and desorbent removal). Details of swing-bed techniques are disclosed in Breck, *Zeolite Molecular Sieves*, pp. 715–718 (John Wiley & Sons, N.Y., N.Y., 1974) and of simulated moving-bed techniques in Broughton, "Adsorptive Separation (Liquids)", *Encyclopedia of Chemical Technology*, pp. 563–581 (John Wiley & Sons, N.Y., N.Y., Kirk-Othmer eds. 3rd ed., 1978), the disclosures of both of which are incorporated herein by reference.

The desorbent chosen to desorb the chlorohydrins, and thus regenerate the zeolite, should be compatible with the zeolite (i.e., should not degrade the zeolite). Examples of suitable desorbents include hydrocarbon solvents, e.g., pentane and/or ethyl ether. The desorbent should be of food grade so that any residual desorbent in the zeolite or impurities in the desorbent will not have to be removed to avoid the risk of adversely affecting the quality of successive hydrolysed protein purified with regenerated zeolite. Preferred desorbents include water-miscible organic solvents such as the lower alkanols, e.g., methanol, ethanol, and isopropanol. The use of a water-miscible organic solvent allows the removal of the residual solvent from the bed (by washing the bed with water) prior to introduction of additional hydrolysed protein. Depending upon the desorbent, it may also be possible to recover desorbent used in regeneration, e.g., by fractional distillation.

Ethanol has been found to be particularly useful as a desorbent. It has been found to efficiently remove chlorohydrins from zeolite over practical residence times, it can be efficienty removed from the zeolite bed by washing with water, and small residual amounts of ethanol in the purified hydrolysed protein are unobjectionable with respect to the use of the purified hydrolysed protein as a food ingredient.

The extent of the reduction in chlorohydrin concentration in the hydrolysed protein will, of course, depend upon the contact time and contact level, i.e., the fraction of crystalline zeolite as a weight percentage of the hydrolysed protein solution contacted with said crystalline zeolite. For example, it has been found that a contact time of about 100 to about 200 seconds at a contact level of about 1.5% will reduce the DCP concentration by about 80 to about 90%. This reduction has been found to be largely independent of concentration of DCP in the hydrolysed protein (over the tested levels of DCP ranging from about 100 ppb to about 40,000 ppb). In general, contact times should be greater than about 30 seconds to remove greater than a nominal percentage of the DCP from a particular sample. Contact times of at least about 1 minute, typically from 1 to 2 minutes, are preferred. Contact levels should, in general, be greater than about 0.05%, preferably from about 0.1% to about 1%, over the contact times discussed above.

The hydrolysed proteins can be analyzed for the presence of DCP by the method described in U.S. Pat. No. 4,759,944 (Fasi et al.), the disclosure of which is incorporated herein by reference. The results shown in the following examples were obtained in accordance with that method. All parts, percentages and ratios stated herein are by weight unless otherwise indicated.

EXAMPLES

EXAMPLE 1

A sample of hydrolysed soy meal (2% nitrogen, 36% d.s., hereinafter HSM) was analyzed for DCP and was found to contain 93 ppb. A one liter separating funnel was charged with 275 grams of the HSM. A column was packed with a granular crystalline zeolite agglomerate having 20×60 mesh granules available from Union Carbide Corporation as Molecular Sieve Type 82A (Lot No. 13356), hereinafter ZA-82, to create a packed cylindrical bed 12.5 cm in depth and 2.75 cm in diameter. The 275 grams of HSM was gravity fed into the bed at a rate which allowed the HSM to exit the bed to a fraction collector at 6.5 ml/min. The eluate was analyzed for DCP and none was detected.

EXAMPLE 2

A sample of HSM in an amount of 8100 g was spiked with DCP at a level of 400 ppb. This sample was fed through the apparatus of Example 1 as described in Example 1, but containing fresh ZA-82. Samples of eluate were taken at eight different intervals and analyzed for DCP. After discounting readings later confirmed as false positives, no DCP was detected in any of the eight successive samples of eluate or in a composite of the total eluate. Thus, at a contact level of 0.6%, all DCP was removed from a sample of HSM spiked at a level of 400 ppb.

EXAMPLE 3

A counter-gravity flow apparatus was constructed and used as follows. A parastaltic pump drew HSM spiked with DCP at a level of 400 ppb from a reservoir of 66 kg through flexible tubing at a rate of 0.6 liter/hour. The HSM was fed to the bottom of a packed bed 42 cm in depth and 3.5 cm in diameter of fresh ZA-82 and thence to a fraction collector. Samples were taken from the eluate stream at eight different intervals and no DCP was detected in these successive samples. The eluate was collected as two separate composites, one of approximately the first half of the total eluate and the other of approximately the second half of the total eluate. No DCP was detected in either composite.

EXAMPLE 4

The counter-gravity flow apparatus of Example 3, packed with fresh ZA-82, was used to purify 21 kg of a highly spiked sample of HSM, i.e., spiked with DCP at a level of 40,000 ppb. The following table shows the identity and DCP content of the various samples collected after elution of the amount of HSM shown in Table 1.

TABLE 1

| Results of Counter-Gravity Flow Purification of Example 4 | | |
|---|---|---|
| Sample No. | Treatment | DCP (ppb) |
| 1 | 1,3-DCP Spiked Feed | 33,090 |
| 2 | First Column Eluate | None detected |
| 3 | After 1.2 kg of Eluate | None detected |
| 4 | After 2.5 kg of Eluate | 103 |
| 5 | After 4.3 kg of Eluate | 96 |
| 6 | After 6.7 kg of Eluate | 121 |

TABLE 1-continued
Results of Counter-Gravity Flow Purification of Example 4

| Sample No. | Treatment | DCP (ppb) |
|---|---|---|
| 7 | After 15.8 kg of Eluate | 111 |
| 8 | After 18.6 kg of Eluate | 96 |
| 9 | After 21.0 kg of Eluate | 273 |
| 10 | Feed at End of Run | 30,430 |
| 11 | Composite of All Eluate | 111 |

The level of 273 ppb DCP found in the final eluate sample, when compared to earlier samples, may indicate that the zeolite may have been near its capacity for adsorption of DCP.

EXAMPLE 5

Two separate samples of spent ZA-82 packing from Example 4 were treated with two different organic solvents to extract or wash DCP therefrom.

The first sample was dried and extracted with a mixture of pentane and ethyl ether at a solvent to packing ratio of 20:1. The solvent was found to contain 1,192,000 ppb DCP and, thus, 88.4% of the DCP in the packing sample was recovered.

The second sample was washed with 95% aqueous ethanol at a solvent to packing ratio of 2:1. The solvent was found to contain 325,800 ppb of DCP and, thus, 58.0% of the DCP in the packing sample was recovered.

EXAMPLE 6

The counter-gravity flow apparatus of Example 3, packed with fresh ZA-82, was used to treat hydrolysed corn gluten (2% nitrogen, 36% d.s., hereinafter HCG) at a contact time of 30.5 seconds and at the contact levels shown below in Table 2. The column was then washed with ethanol. The DCP content and recovery of DCP in the composite eluates are shown below in Table 2.

TABLE 2
Results of Counter-Gravity Flow at Shortened Contact Time

| Sample No. | Sample Identity | DCP (ppb) | Recovery (Wt. %) |
|---|---|---|---|
| 1 | Beginning HCG Feed | 358 | — |
| 2 | Final HCG Feed | 324 | — |
| 3 | Beginning Eluate at 1% Contact Level | 330 | — |
| 4 | Beginning Eluate 0.1% Contact Level | 351 | — |
| 5 | Beginning Eluate at 0.05% Contact Level | 249 | — |
| 6 | Composite Eluate at 0.1% Contact Level | 279 | 12.2 |
| 7 | Composite Eluate at 0.05% Contact Level | 312 | 8.6 |
| 8 | Ethanol Wash | 7,668 | 130.0 |

EXAMPLE 7

A sample of HSM was spiked with DCP and was analyzed after spiking as containing 8,520 ppb. The counter-gravity flow apparatus of Example 3, packed with fresh ZA-82, was employed as follows. HSM was fed as described in Example 3 to the bed to obtain a contact time of 43.3 sec at a contact level of 0.5%. The residual HSM was then drained from the bed. The bed was then washed with two bed volumes of deionized water and drained. The bed was then treated (counter-gravity flow at same rate as HSM) with four bed volumes of ethanol and washed with two more bed volumes of deionized water before being drained. The resulting regenerated bed was then used to purify another aliquot of HSM as described above and regenerated as described above three successive times. The ethanol used in the first and second regenerations was technical grade (i.e., food grade) 95% aqueous ethanol and that used in the third and fourth regenerations was industrial grade (i.e., denatured) 3A ethanol. The DCP content of the HSM eluate, ethanol eluate and the percent recovery (based on the quotient of the amount of DCP contained in the ethanol eluate and the DCP removed from the HSM eluate) are shown in Table 3, below.

TABLE 3
Results of Ethanol Regeneration of Granular Crystalline Zeolite Agglomerate

| Sample No. | Sample Identity | DCP (ppb) | Recovery (Wt. %) |
|---|---|---|---|
| 1 | HSM Feed Spiked with DCP | 8,520 | — |
| 2 | First HSM Composite Eluate | 3,410 | 40 |
| 3 | First Ethanol Regeneration Eluate | 253,440 | 129.3 |
| 4 | Second HSM Composite Eluate | 3,230 | 37.9 |
| 5 | Second Ethanol Regeneration Eluate | 229,560 | 118.7 |
| 6 | Third HSM Composite Eluate | 2,900 | 34.0 |
| 7 | Third Ethanol Regeneration Eluate | 209,040 | 106.9 |
| 8 | Fourth HSM Composite Eluate | 2,980 | 35.0 |
| 9 | Fourth Ethanol Regenerative Eluate | 214,560 | 103.6 |
| 10 | HSM Feed At End of Run | 7,100 | — |
| 11 | Composite of HSM Eluates | 3,150 | — |

The results shown above indicate that a granular crystalline zeolite agglomerate can be used and regenerated with ethanol with substantially complete removal of DCP and apparently no loss of activity for reduction of DCP, even at extremely high levels of DCP in the hydrolysed protein feed and at or near the capacity of the zeolite.

COMPARATIVE EXAMPLE A

A sample of HCG was subjected to batch purification with powdered crystalline zeolite, available from Union Carbide Corp. as Molecular Sieve Type 82A, as follows. The powdered crystalline zeolite and hydrolysed protein were charged to open one-liter vessels and were magnetically stirred at room temperature for the contact times shown in Table A. The amounts of each were adjusted to yield the contact levels (wt. of crystalline zeolite as a percentage of wt. of hydrolysed protein solution) shown in Table A. After the contact times shown below in Table A, the hydrolysed protein was collected as filtrate by gravity through No. 2 Whatman filter paper. The results of treatment at various contact levels and times are shown in Table A.

TABLE A

Results of DCP Analysis of Batch Treatment with Powdered Crystalline Zeolite

| Sample | Treatment | DCP (ppb) |
|---|---|---|
| Control | Untreated | 296 |
| 1A | 0.001%/40 min. | 306 |
| 2A | "/20 min. | 278 |
| 3A | "/10 min. | 245 |
| 4A | 0.01%/40 min. | 277 |
| 5A | "/20 min. | 312 |
| 6A | "/10 min. | 249 |
| 7A | 0.1%/40 min. | 229 |
| 8A | "/20 min. | 306 |
| 9A | "/10 min. | 296 |
| 10A | 1.0%/40 min. | 272 |
| 11A | "/20 min. | 254 |
| 12A | "/10 min. | 264 |
| 13A | "/60 min. | 252 |
| 14A | 0.001%/26 min. | 239 |
| 15A | "/60 min. | 294 |
| 16A | 0.1%/20 min. | 223 |
| 17A | "/120 min. | 248 |
| 18A | 0.001%/16 hrs. | 286 |
| 19A | 0.1%/16 hrs. | 181 |

The above results indicate no significant activity for DCP removal. No significant differences for contact level were observed and only slight and probably statistically insignificant (approximately 5%) reductions of DCP were noted at practical contact times. A slight and possibly statistically insignificant reduction in DCP over increased contact times was indicated.

EXAMPLE 8

A sample of HCG containing 65.7 ppm 3-chloro-1,2-propanediol was treated as in Example 3, except that the bed was contained in a column 20 cm in depth and 1.5 cm in diameter and the HCG was fed at a flow rate of 1.0 liter/hour. The concentration of 3-chloro-1,2-propanediol was reduced to 45.9 ppm, a reduction of approximately 30%. Considering the very high concentration of 3-chloro-1,2-propanediol in the HCG bed and the small size of the column, the bed probably became saturated leading to the reduction of only 30%. It is contemplated that HCG having typical levels of 3-chloro-1,2-propanediol (e.g., about 1-2 ppm) would exhibit a much higher percentage reduction, and thus a more useful reduction of 3-chloro-1,2-propanediol.

What is claimed is:

1. A method of purifying a hydrolysed protein comprising contacting an aqueous mixture of hydrolysed protein having a chlorohydrin concentration greater than about 50 ppb with a crystalline zeolite agglomerate to reduce the amount of chlorohydrin in said aqueous mixture.

2. A method of claim 1 wherein said crystalline zeolite agglomerate has a particle size greater than about 100 micrometers.

3. A method of claim 1 wherein said crystalline zeolite agglomerate is selected from the group consisting of zeolite granules, zeolite pellets and zeolite beads.

4. A method of claim 2 wherein said crystalline zeolite agglomerate is a Type A zeolite.

5. A method of claim 4 wherein said zeolite is Type 82A.

6. A method of claim 1 wherein said contacting is accomplished at a contact level and for a contact time sufficient to reduce the chlorohydrin concentration to no greater than about 50 ppb.

7. A method of claim 1 wherein said contacting is accomplished at a contact time of from about 10 seconds to about 1,000 seconds and a contact level of from about 0.01% to about 10%.

8. A method of claim 1 wherein said hydrolysed protein has a chlorohydrin content before said contacting of from about 100 ppb to 1,000 ppb and said contacting is accomplished at a contact level and for a contact time sufficient to reduce the chlorohydrin level after said contacting to no greater than about 50 ppb.

9. A method of claim 1 further comprising removing said hydrolysed protein from said zeolite and then contacting said zeolite with a desorbent comprised of a water-miscible organic solvent to remove chlorohydrins from said zeolite, then washing water-miscible organic solvent from said zeolite with water.

10. A method of preparing hydrolysed proteins useful as food ingredients comprising:
hydrolysing a protein in an aqueous medium at an acidic pH, said aqueous medium additionally comprising chloride and a member selected from the group consisting of glycerol and precursors thereof to produce a chlorohydrin concentration greater than about 50 ppb, and
contacting said aqueous medium, after said hydrolysing, with a crystalline zeolite agglomerate to reduce said chlorohydrin concentration.

* * * * *